US008864176B2

(12) United States Patent
Lasser

(10) Patent No.: US 8,864,176 B2
(45) Date of Patent: Oct. 21, 2014

(54) MUD FLAP LIFTING SYSTEM

(71) Applicant: Douglas A. Lasser, Hope (CA)

(72) Inventor: Douglas A. Lasser, Hope (CA)

( * ) Notice: Subject to any disclaimer, the term of this patent is extended or adjusted under 35 U.S.C. 154(b) by 63 days.

(21) Appl. No.: 13/842,029

(22) Filed: Mar. 15, 2013

(65) Prior Publication Data

US 2013/0285358 A1    Oct. 31, 2013

Related U.S. Application Data

(63) Continuation-in-part of application No. 12/923,420, filed on Sep. 21, 2010, now abandoned.

(51) Int. Cl.
*B62D 25/18* (2006.01)

(52) U.S. Cl.
CPC ............ *B62D 25/182* (2013.01); *B62D 25/188* (2013.01)
USPC ............................ 280/851; 280/847; 280/848

(58) Field of Classification Search
CPC .... B62D 25/16; B62D 25/163; B62D 25/166; B62D 25/168; B62D 25/18; B62D 25/182; B62D 15/188
USPC ......................... 280/847, 848, 851; 298/1 SG
See application file for complete search history.

(56) References Cited

U.S. PATENT DOCUMENTS

| | | | | |
|---|---|---|---|---|
| 2,653,846 | A | * | 9/1953 | Wiley .......................... 298/1 SG |
| 2,721,760 | A | | 10/1955 | Lapham et al. |
| 2,809,848 | A | * | 10/1957 | Carswell ........................ 280/851 |
| 2,857,200 | A | * | 10/1958 | Hoppesch .................... 298/1 SG |
| 2,872,211 | A | * | 2/1959 | Barrett .......................... 280/851 |
| 2,981,553 | A | * | 4/1961 | Zerbe, Sr. ..................... 280/851 |
| 3,059,945 | A | * | 10/1962 | Robb ............................ 280/851 |
| 3,165,360 | A | | 1/1965 | Saxton et al. |
| 3,203,701 | A | | 8/1965 | Harting, Jr. |
| 3,203,710 | A | * | 8/1965 | Harting, Jr. ................... 280/851 |
| 3,248,126 | A | | 4/1966 | Saxton et al. |
| 3,507,513 | A | | 4/1970 | Bohrer |
| 3,582,109 | A | | 6/1971 | Moore |
| 3,788,668 | A | * | 1/1974 | Perger .......................... 280/851 |
| 3,794,383 | A | * | 2/1974 | France et al. ................ 298/1 SG |
| 3,802,739 | A | * | 4/1974 | Knyszel et al. ............. 298/1 SG |
| 3,806,196 | A | | 4/1974 | Cole et al. |
| 3,806,197 | A | | 4/1974 | Knyszek et al. |
| 3,877,722 | A | | 4/1975 | Conner |
| 3,905,616 | A | * | 9/1975 | Tamburino et al. ........... 280/851 |
| 4,097,090 | A | | 6/1978 | Payne et al. |
| 4,113,269 | A | * | 9/1978 | Richardson et al. .......... 280/851 |
| 4,221,432 | A | | 9/1980 | VanRemortel et al. |
| 4,319,764 | A | | 3/1982 | Whitaker |
| 5,582,431 | A | | 12/1996 | Anderson |
| 6,139,062 | A | * | 10/2000 | Meyer .......................... 280/851 |
| 6,158,775 | A | | 12/2000 | Nickels |

(Continued)

FOREIGN PATENT DOCUMENTS

CA          2197731          8/1997

*Primary Examiner* — Katy M Ebner
(74) *Attorney, Agent, or Firm* — Antony C. Edwards

(57) ABSTRACT

A mud flap lifter system wherein the rigid upper portion of a bi-fold mud flap is actuated to rotate and thereby raise upwardly the upper portion so as to draw upwards the rigid lower portion hinged to the upper portion. The upper portion rotates relative to the lower portion about a hinge line between the upper and lower edges of the lower and upper portions respectively. The upper and lower portions may be substantially planar.

21 Claims, 13 Drawing Sheets

(56) References Cited

U.S. PATENT DOCUMENTS

| | | |
|---|---|---|
| 6,402,200 B1 | 6/2002 | Myers |
| 6,446,900 B1 | 9/2002 | Syska et al. |
| 6,565,122 B1 | 5/2003 | Hansen |
| 6,799,808 B1 | 10/2004 | Walters |
| 7,021,665 B2 | 4/2006 | Keller |
| 7,850,206 B2 * | 12/2010 | Proctor .................. 280/848 |
| 2003/0184078 A1 * | 10/2003 | Grable .................. 280/847 |
| 2004/0164539 A1 | 8/2004 | Bernard |

* cited by examiner

MUD FLAP LIFTING SYSTEM

FIELD OF THE INVENTION

This invention relates to the field of devices for lifting mud flaps on the back of vehicles, such as trucks or their trailers, into a raised position away from the rear surface of the vehicle tires. In particular this invention relates to a mud flap lifting system wherein each mud flap is a substantially rigid laterally-bifolding structure, the upper portion of which is rigidly mounted to a selectively rotatable shaft for rotating the upper portion about the shaft to a raised position under the vehicle bed, and the lower portion of which is hinged to the upper portion so that, as the upper portion is raised, the lower portion is lifted up and out of the way under the vehicle bed and to the rear of the tires.

BACKGROUND OF THE INVENTION

Mud flaps on trucks are subject to compliance standards which are enforced by the regulating authority in the relevant jurisdiction. To applicant's knowledge, several jurisdictions a so-called one third rule is applied in regulating the clearance between the ground and the bottom of the mud flaps; namely, that the clearance cannot exceed one third of the distance between the mudflap and the axle centre of the nearest axle to the mud flap. Thus, for example, if the horizontal distance between the mud flap when hanging free and the axle centre of the nearest axle to the mud flap is 24 inches, the lowermost edge of the mud flap can be no more than eight inches above the ground. This amount of clearance can cause problems when a dump truck is backing up to dump its load.

As stated by Nickels in his U.S. Pat. No. 6,158,775 which issued Dec. 12, 2000, vehicles which require mud flaps, such as trucks and trailers, frequently have the mud flaps torn from their mounting brackets during normal operation of the vehicle, and in particular, the majority of the mud flaps are torn off when the vehicle is backing up or when dumping a load at the back of the vehicle. Nickels gives one example of when trucks or trailers are backing up over rough terrain, such as stone, loose dirt, heavy snow/ice, curbs or other similar obstacles, stating that the mud flaps are often caught under the tires of the vehicle, which tears the mud flap from the mud flap's mounting bracket. Nickels states that in some cases the weight of the vehicle backing over mud flap will pull the flap brackets, chrome, and other mounting devices from the vehicle. It has been applicant's and Nickels' experience that owners and operators of vehicles which require mud flaps are frustrated by the time and expense required to replace mud flaps which are damaged or torn from their mounting brackets; that is, even though the mud flaps are not in themselves expensive, the lost operating time for the vehicle and the additional manpower expense required to install new mud flaps can become a significant operating expense for the owner/operator. Lack of a mud flap may also attract a fine or result in a shut-down of operations.

Also, in the prior art applicant is aware of United States published patent application publication no. 2003/0184078 published Oct. 2, 2003 for the Mud Flap Lifting System of Grable. In Grable, when the user wishes to retract assemblies 14 the user actuates valve 36 causing activator 22 to extend rod 24 rearwardly to a second position. To lower the mud flaps it is assumed that the user would have to reverse the procedure. If the user forgets to activate valve 36 to raise the flaps the flaps may get damaged. If the user forgets to lower the flaps, the user may be fined for short mud flaps and no brake or signal lights showing if the lights are mounted in the top portion of the flaps as shown. If the user backs the vehicle up a hill, raises the flaps and dumps the load with the lower flap 30 hanging down in a vertical position and then moves ahead and lowers the box before lowering the flaps, the flaps may get damaged or the tires may be damaged.

In the prior art applicant is further aware of U.S. Pat. No. 3,203,710 which issued Aug. 31, 1965, to Harting Jr. for a Mud Flap Retractor. Harting Jr. notes that "the additional operating means are too often forgotten by the truck driver." (emphasis added).

Harting Jr. does not mention an anti-sail cable. All he provides is a cable for lifting the flaps after the box is raised. In applicant's view Harting Jr's. cable would not work as an anti-sail device. His cable lifts the flaps by bending them inward. If the flaps may be bent in, then they would also bend out and raise the bottom of the flap up because of the wind while travelling thereby causing the flaps to sail backwards. Harting Jr. would have to for example have a stiffener rod in the center of the flaps for the cable to pass through, however that would not work using a flexible flap. Harting Jr. would have worn out the cable #8 and guides #16 and 17 in a short time without the use of pulleys. His flaps could get caught in the up position if the frayed cable got caught in the worn guides by only using gravity to lower the flaps. In the present invention, the flaps lower by air pressure through the air cylinder.

If Harting Jr. or Grable would have had legal length flaps, when they backed a loaded gravel truck up the flaps would have hit an obstruction and stopped. The tires would have ripped or torn the flaps off.

In the prior art, and apart from the Nickels U.S. Pat. No. 6,158,775, applicant also aware of U.S. Pat. No. 3,165,360, which issued Jan. 12, 1965 to Saxton et al for an Automatic Mud Flap Retractor for Dump Truck Vehicles; U.S. Pat. No. 3,248,126, which issued Jun. 1, 1964 to Saxton et al for Mud Flap Retractors; U.S. Pat. No. 3,582,109, which issued Jun. 1, 1971 to Moore for a Mud Flap Retraction Apparatus; U.S. Pat. No. 3,806,196 which issued Apr. 23, 1974 to Cole et al for an Automatic Mud Flap Retractor for Rear-Dumping Trucks; U.S. Pat. No. 6,139,062, which issued Oct. 31, 2000 to Meyer for a Mud Flap Lifter; U.S. Pat. No. 6,402,200 which issued Jun. 11, 2002 to Myers for an Apparatus and Method for Moving Mud Flaps to a Protected Position; U.S. Pat. No. 6,623,038 which issued Sep. 23, 2003, to Heem for an Automatic Lifting Mud Flap Assembly; United States Publication No. US2004/0164539 which published Aug. 26, 2004 to Bernard for a Mud Flap Lifter System; U.S. Pat. No. 6,799,808 which issued Oct. 5, 2004 to Walters for a Dump Truck Automatic Mud Flap Retractor System; and U.S. Pat. No. 7,021,665 which issued Apr. 4, 2006 to Keller for a Mud Flap Saver Apparatus.

SUMMARY OF THE INVENTION

In the present invention, when the driver of the vehicle, with the mud flaps according to the present invention installed, puts the transmission in reverse, the flaps automatically raise to their raised position. The bottom portion of the flap fits up under the top portion of the flap. As the box rises the bottom portion fits even tighter under the top portion. A wire from the back up light or back up alarm runs to an electric-over-air, hydraulic or vacuum valve. The valve activates the cylinder which activates a bell crank and raises the mud flaps. Preferably, when the mud flaps are activated a flashing or blinking light comes on, located on the dashboard of the vehicle in plain view of the driver. Next to the light, or located in the light itself, is a switch which the driver touches momentarily to lower the flaps. A sensor device located between the box and the frame of the truck prevents the flaps from being lowered until the box is lowered all the way down. The sensor device may cause the mud flaps to raise using the same valve when the box is raised a few inches above the truck frame, even if the driver does not back up before dumping the load. If the load is being dumped uphill, downhill, or on the flat, the mud flaps do not come near the tires so as to avoid them being damaged.

In applicant's experience driving gravel trucks, all of the flaps that were damaged were caused by backing over them and ripping them off. Lifting the flaps while the load is being dumped is too late which is why the flap raising system according to the present invention lifts the flaps before dumping.

In summary, the mud flap lifter system according to the present invention may be characterized in one aspect as including a bi-fold mud flap which may be actuated to raise upwardly the rigid upper portion of the bi-folding mud flap so as to draw upwards the hinged rigid lower portion of the bi-folding mud flap.

In particular, the mud flap has an upper portion and a lower portion. The upper portion extends laterally across substantially an upper half of the mud flap. The lower portion extends laterally across substantially a lower half of the mud flap. An upper edge of the lower portion is pivotally mounted to a lower edge of the upper portion for rotation relative to the upper portion about a hinge line between the upper and lower edges of the lower and upper portions respectively. The upper portion may be substantially planar and rigid. The lower portion may also advantageously be substantially planar and substantially rigid to avoid bowing of the flap when helped by the anti-sail cable described below. Bowing may cause the flap to become too short, causing a violation of the one third rule. In a further embodiment a second hinge may be needed in some applications, installed between the existing hinge and the bottom of the lower mud flap.

A shaft is mountable or mounted transversely across a rear end of a vehicle. The shaft is adapted to be mounted horizontally across the vehicle behind the rearmost wheels of the vehicle. An actuator mountable or mounted to the vehicle so as to cooperate with the shaft selectively rotates the shaft about a corresponding axis of rotation of the shaft.

An upper edge of the upper portion of the mud flap is mountable or mounted to the shaft. Rotation of the shaft by actuation of the actuator simultaneously rotates the upper portion of the mud flap. Rotation of the upper portion so as to raise the lower edge of the upper portion simultaneously and correspondingly raises the lower portion. The lower portion hangs freely about the hinge line so as to maintain a substantially vertically downwardly disposed orientation as the lower portion is raised, whereby the lower edge of the lower portion is elevated and maintained spaced apart rearwardly of the rearmost wheels of the vehicle and the ground clearance between the lower edge of the lower portion and a ground surface under the wheels is increased. The upper portion of the mud flap may be raised either forwardly, as illustrate herein, relative to the vehicle in which case the lower portion is translated closer to the rear wheels, or may be raised rearwardly relative to the vehicle in some instances, so long as the lower portion is raised.

In a preferred embodiment an anti-sail cable having a lower end and an opposite upper end, is attached at its lower end below the hinge line to the lower portion of the mud flap. The upper end of the cable is mountable or mounted to the vehicle, between the rear end of the vehicle and the rearmost wheels of the vehicle, so as to form an acute angle between the cable and the lower portion of the mud flap when in its lowered position. Rearward sailing of the lower portion of the mud flap is resisted by tension in the cable. Bowing of the flap is resisted by the flap's rigidity. The acute angle is reduced to substantially zero as the upper portion is rotated upwardly, and the lower portion is thereby raised, to a fully raised position.

An anti-sail cable stand-off bracket may be provided to form the acute angle in the cable. The stand-off bracket may include a rigid cantilevered member cantilevered from a corresponding face of the mud flap. In one embodiment the stand-off bracket may be cantilevered substantially orthogonally from a forward face of the mud flap. Preferably, it may be mounted to the forward face on the upper portion of the mud flap, for example adjacent the hinge line.

The shaft on which the mud flap is mounted may be substantially square in cross section. A bell crank may be mounted to the shaft. In particular, one end of the bell crank may be mounted to one end of the actuator, and the opposite end mounted onto the shaft, for example by means of a clamp.

BRIEF DESCRIPTION OF THE DRAWINGS

In the drawings wherein similar characters of reference denote corresponding parts in each view:

FIG. 6b is, in side elevation view, the bell crank of FIG. 6a.

DETAILED DESCRIPTION OF EMBODIMENTS OF THE INVENTION

Figure 1:
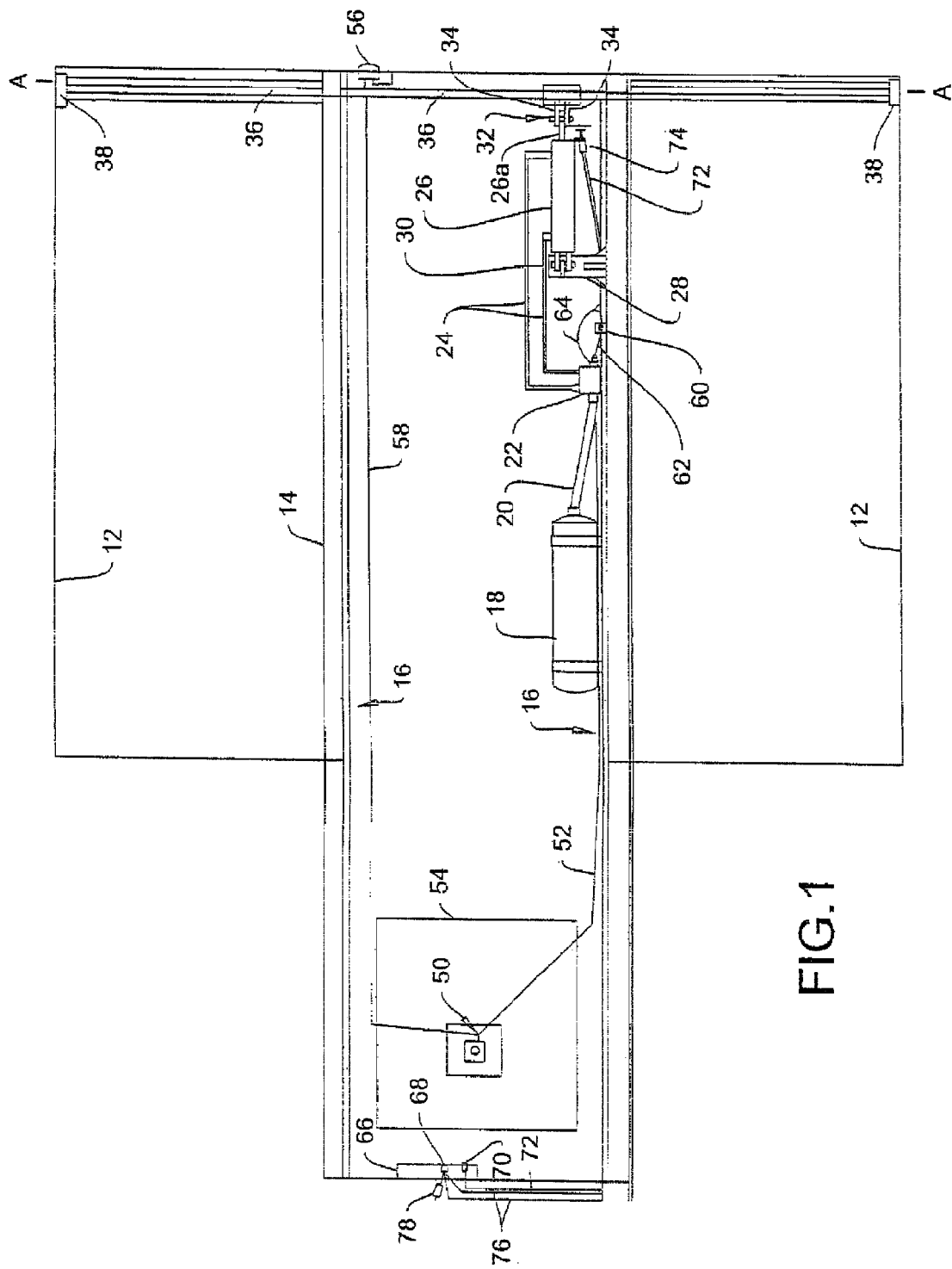
FIG. 1 is, a diagrammatic electrical and air schematic of the mud flap lifting system according to one embodiment of the present invention.
Figure 2:
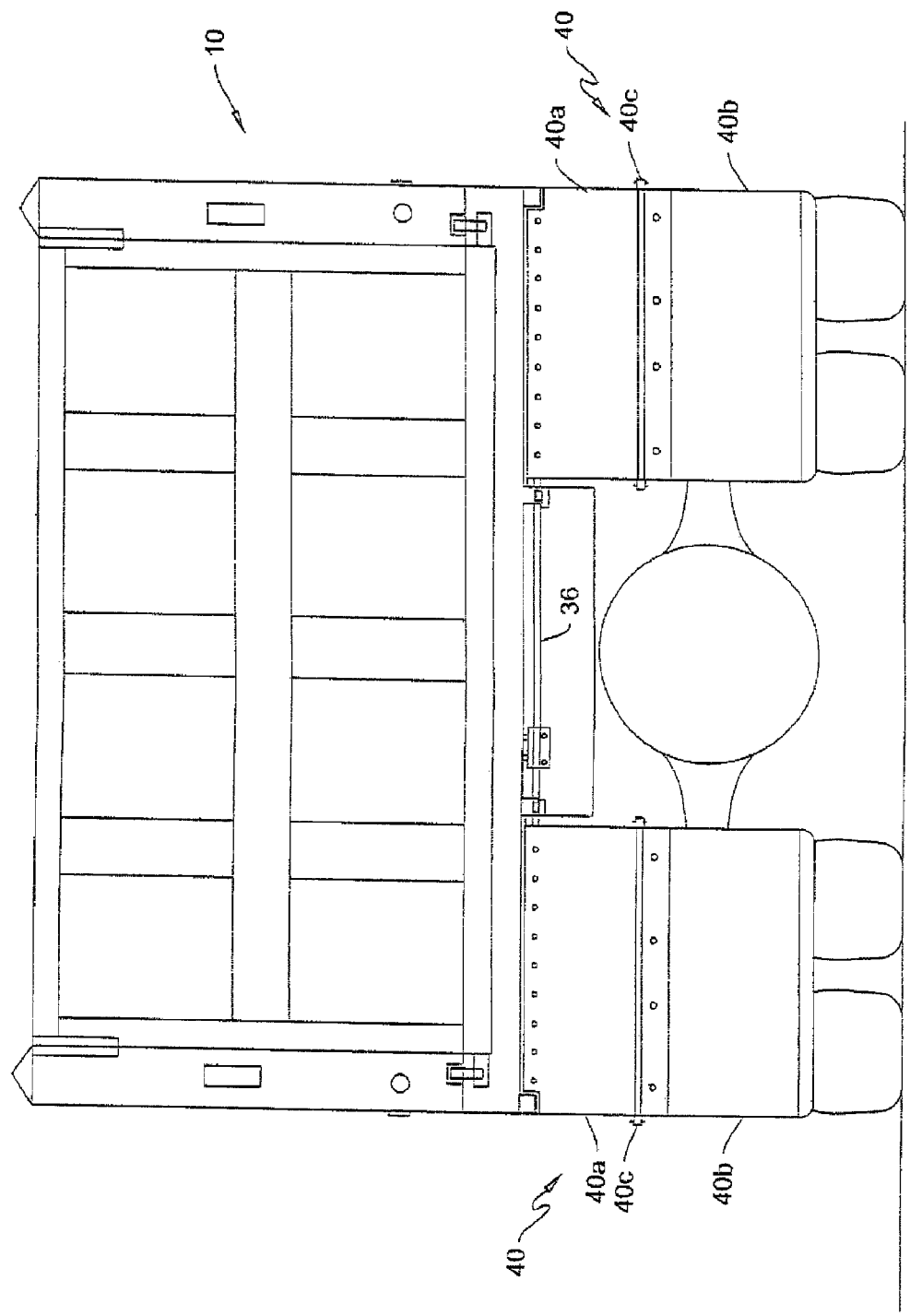
FIG. 2 is, in rear elevation view, a dump truck having the mud flap system according to the present invention mounted thereon.
Figure 3:
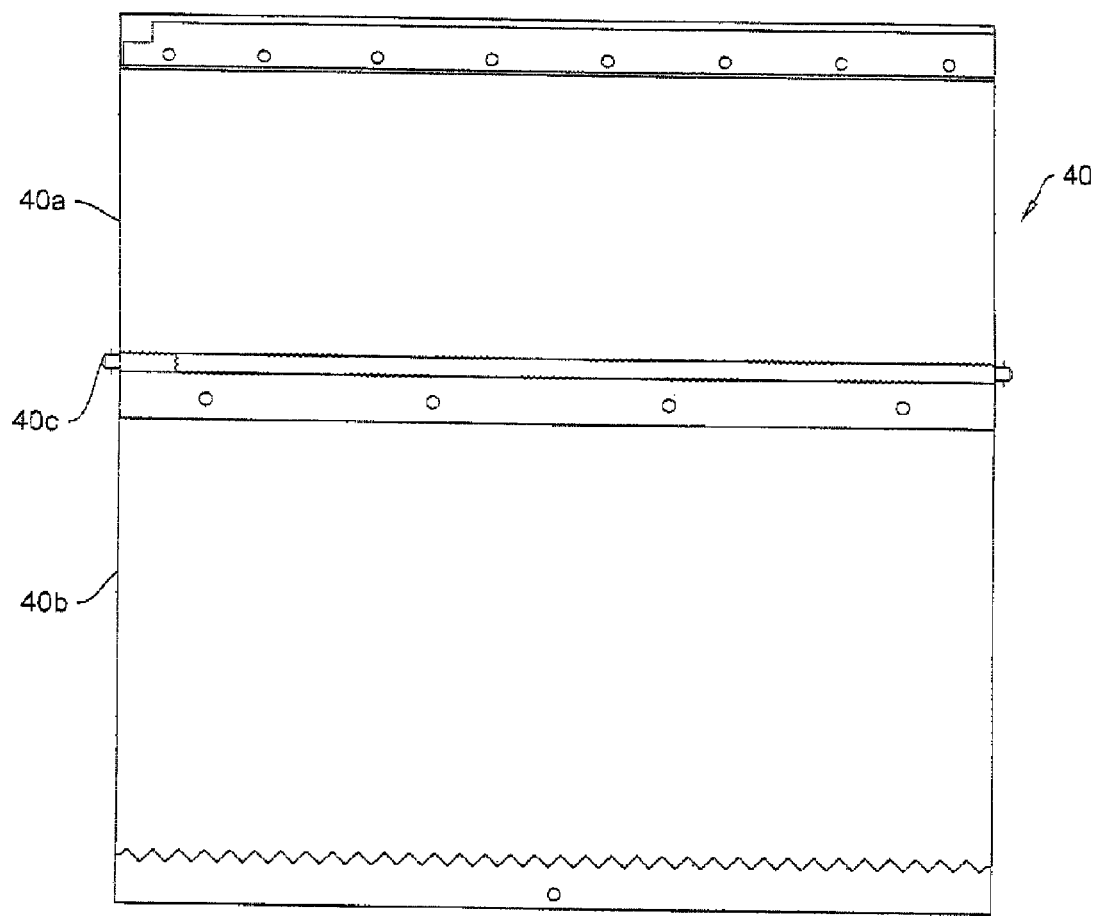
FIG. 3 is, in enlarged rear elevation view, one of the mud flaps of FIG. 2.
Figure 4:
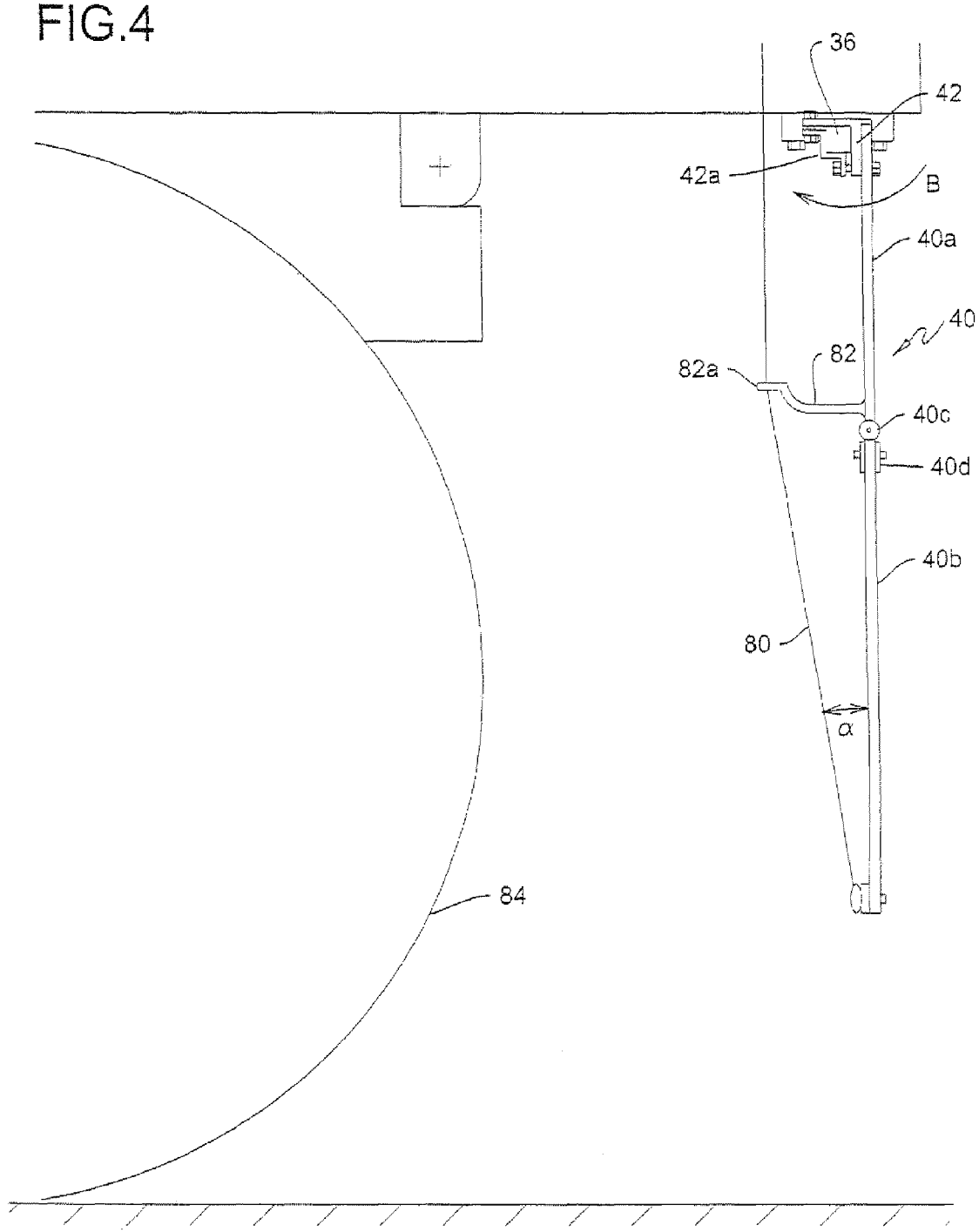
FIG. 4 is, in partially cut away left side elevation view, the mud flap system according to the present invention installed on the rear of the dump truck of FIG. 2, with the mud flaps in their lowered position.

In a preferred embodiment which is not intended to be limiting, the mud flap lifter according to the present invention is pneumatically operated by an air cylinder which pivots a bell crank on a rotatably mounted shaft. This is not intended to be limiting as other forms of actuators, such as hydraulic actuators may also work. The bell crank rotates the shaft. The upper portions of bi-fold mud flaps are mounted on opposite ends of the shaft. The shaft and the mud flaps are mounted under the rear end of the dump box of a dump truck or trailer.

Lower portions of the mud flaps are hinged to the upper portions. Rotation of the shaft rotates the upper portion of the mud flaps between a vertical lowered position and a substantially horizontal raised position, whereby the lower portions are also raised while hanging vertically downward.

The following is a description of the application of the present invention to a dump truck, although this is understood to be by way of example and not intended to be limiting:

Dump truck boxes 10 are mounted on rigid frames which include side frame members 12. Members 12 extend longitudinally along the length of the box on opposite side of the box. A pair of parallel rigid sills 14 run between the side frame members 12, adjacent longitudinally extending truck frame members 16.

An air pressure tank 18 is mounted to one of the truck frame members 16 to supply pressurized air via airline 20 to an electric-over-air valve 22 also mounted to the corresponding box sill 14. Valve 22 controls the flow of pressurized air along air lines 24 so as to operate air cylinder 26 mounted to the same box sill 14 on mounting bracket 28. Air cylinder 26 is pivotally to mounting bracket 28 by means of hinge 30 to thereby allow rotation of air cylinder 26 relative to the truck frame as the box sills are raised and lowered as the dump truck box or trailer box 10 has also been raised to dump a load and thereafter lowered.

The opposite end of air cylinder 26 is pivotally mounted on hinge or pin 32 to a pair of parallel rigid tangs 34; themselves rigidly mounted onto laterally extending shaft 36 by means of mounting bracket 34a.

Shaft 36 is rotatably mounted to side frame members 12 by means of bearings 38. Thus, tangs 34 and mounting bracket 34a provide a bell crank so that in one embodiment, where space provides, extension of air cylinder rod 26a from air cylinder 26 causes rotation of the bell crank about the axis of rotation A of shaft 36. In the illustrated embodiment, rod 26a pushes tangs 34 to raise the mud flaps 40. Alternatively, the actuator 26 and the bell crank 34 may be arranged so that rod 26a pulls on tangs 34 to raise the mud flaps. The arrangement used may be dictated by available space under the vehicle.

Shaft 36 may be square in cross-section. Mounting bracket 34a may be a u-bolt or may be a ninety degree angled piece which mates to an oppositely disposed ninety degree angled back bracket 34b by means of fasteners such as bolts 34c. Both types of mounting brackets avoid weakening shaft 36 by the mounting of the bell crank arms, that is, tangs 34, to the shaft through bolt holes formed in the shaft. The use of such mounting brackets also allows for ease of replacement and repair, and for ease of positioning and fitment of the bell cranks.

When it is desired to raise mud flaps 40 from their lowered position hanging substantially vertically down from shaft 36, air cylinder 26 is actuated so as to extend rod 26a to thereby rotate shaft 36 in direction B about axis of rotation A. Rotation in direction B also rotates the rigid upper portion 40a of mud flap 40 as upper portion 40a is rigidly mounted as, for example, by bolting, to mounting brackets 42. Brackets 42 may be in a fashion similar to mounting brackets 34a, formed of ninety degree angle rigid lengths which bolt to oppositely disposed ninety degree angled backing plates 42a so as to clamp therebetween square cross sectioned shaft 36.

The lower portion 40b of mud flap 40 is pivotally mounted to upper portion 40a by means of hinge 40c. Hinge 40c may fastened as by welding to upper portion 40a, and may be bolted onto lower portion 40b by means of U-shaped channel 40d. As upper portion 40a is rotated in direction B, lower portion 40b is carried in an arc C upwardly to a fully elevated position tucked snugly up underneath the truck box when in its lowered position so as to thereby carry lower portion 40b into its stowed position depending downwardly and substantially vertically from hinge 40e suspended in U-shaped channel 40d.

Figure 5:
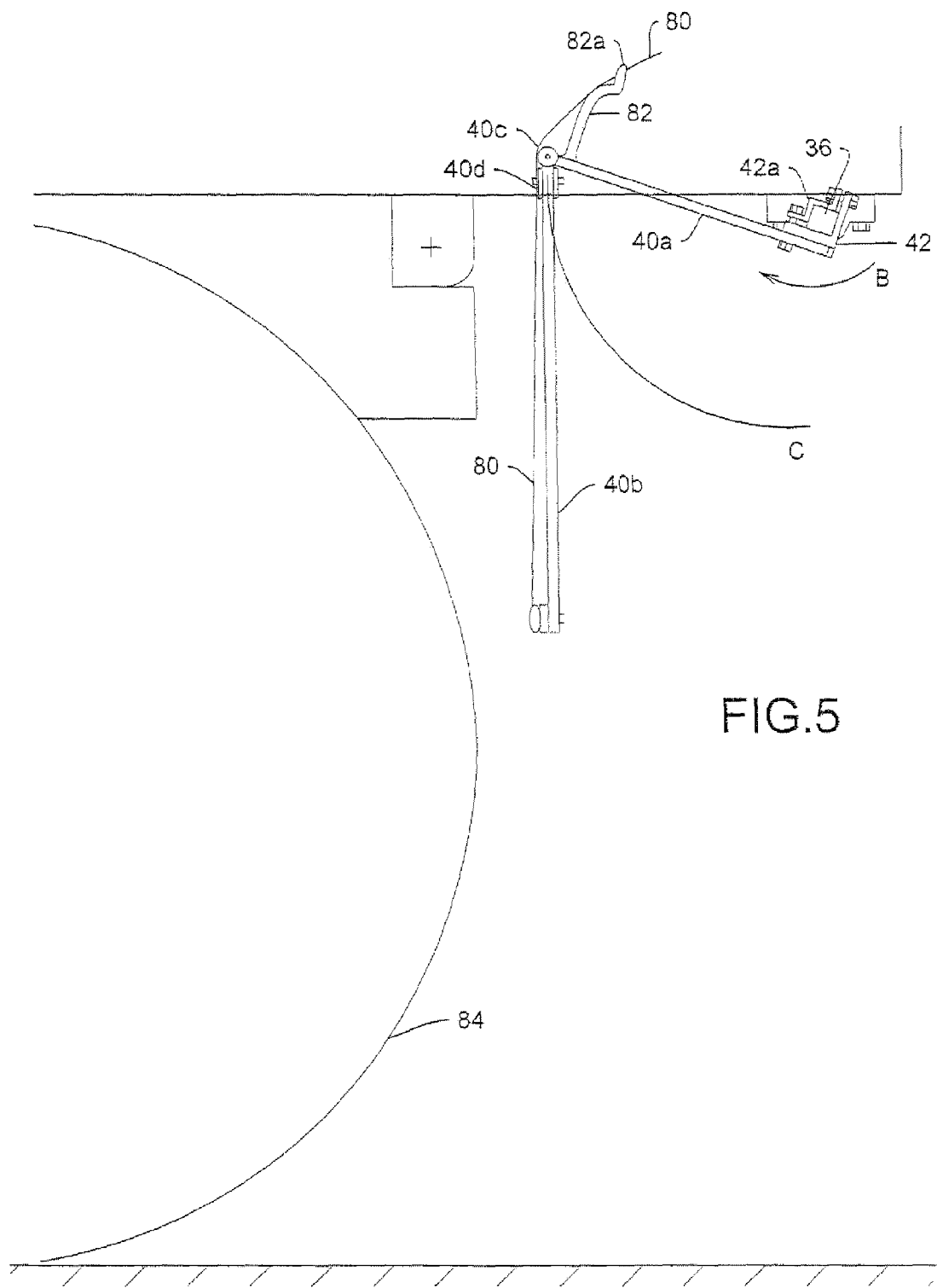
FIG. 5 is the view of FIG. 4 with the mud flaps in their raised position.
Figure 6A:
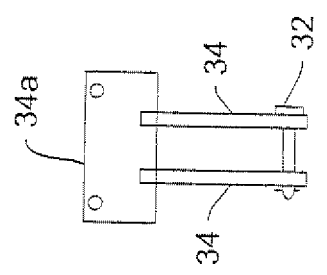
FIG. 6A is, in plan view, one of the bell cranks of the mud flap lifting system according to FIG. 1.
Figure 6B:
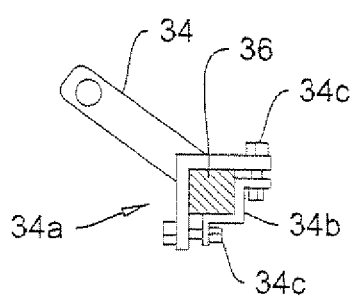
Figure 7:
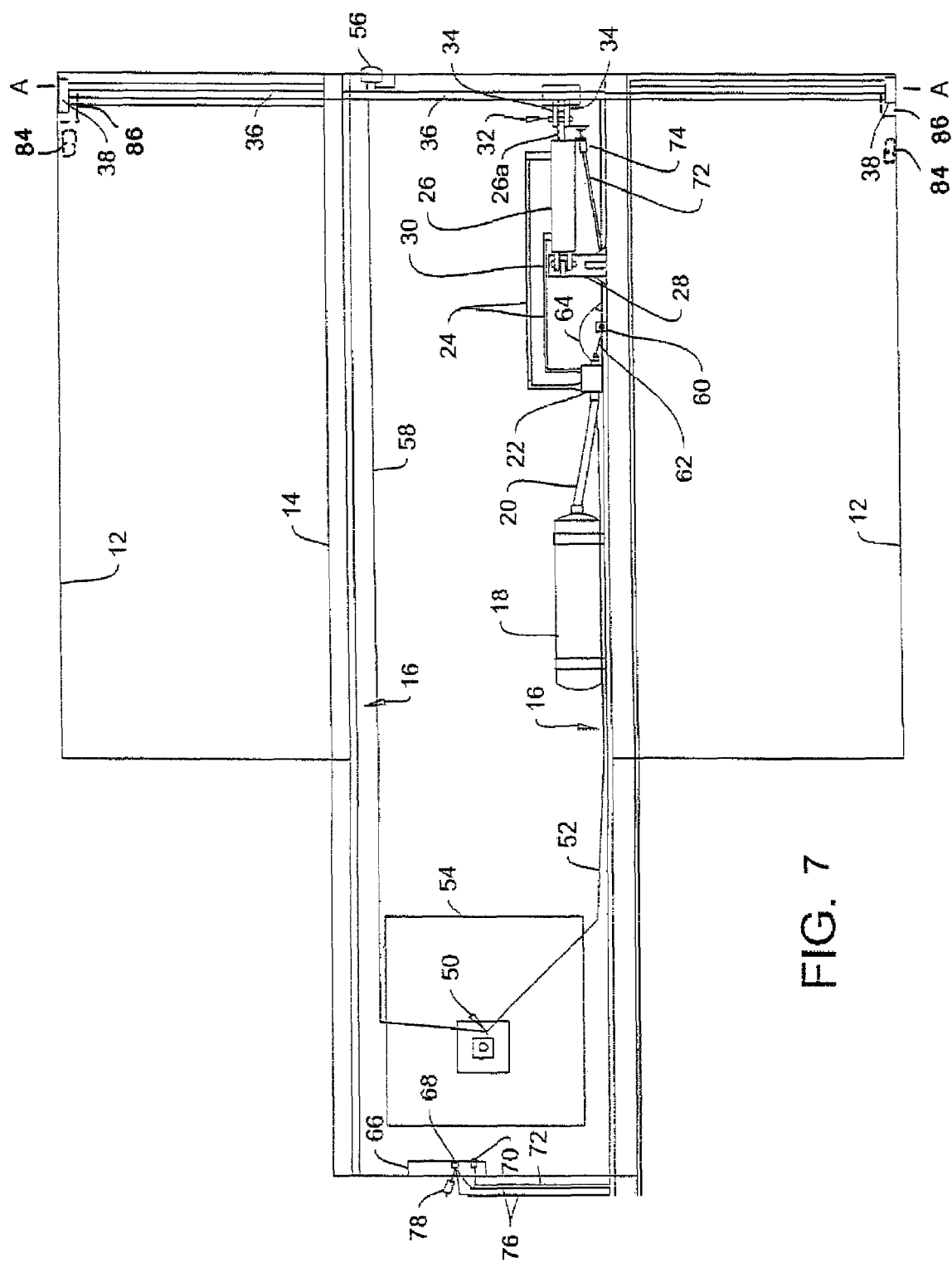
FIG. 7 is the view of FIG. 1, but including alternative embodiment mud flap lifting guides.
Figure 8:
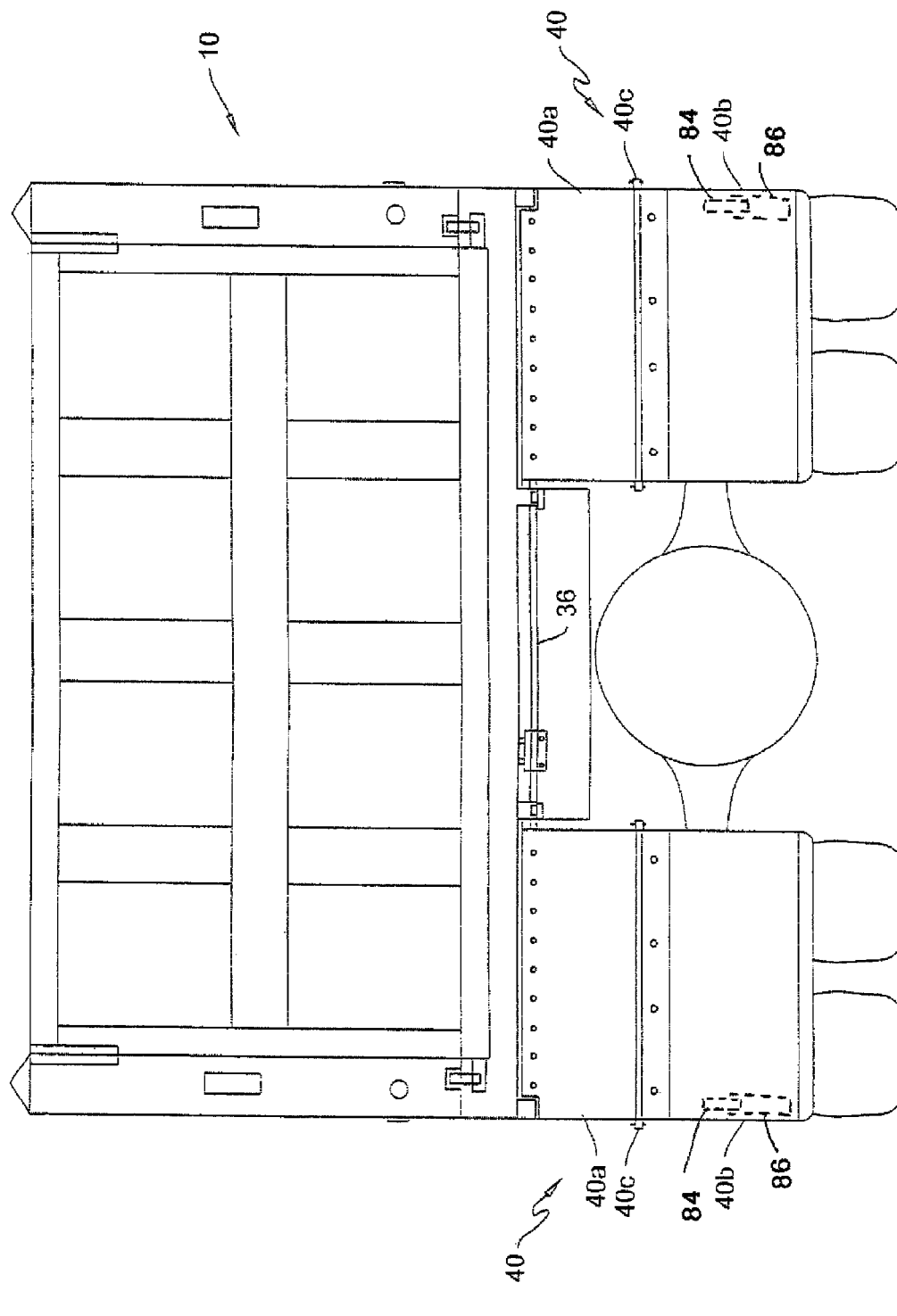
FIG. 8 is the view of FIG. 2 but including the alternative embodiment of FIG. 7.
Figure 9:
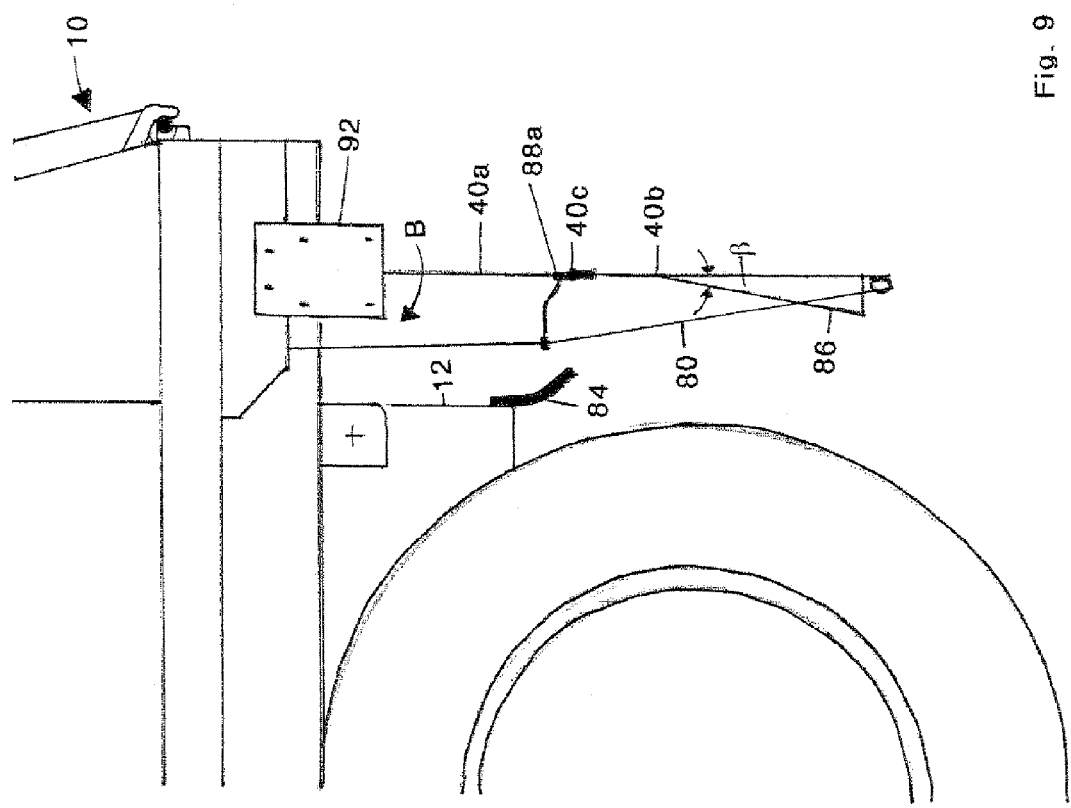
FIG. 9 is, in side elevation, the rear end of the truck of FIG. 8 showing the alternative embodiment mud flap lifting guides, with the truck box lowered and the mud flaps lowered.
Figure 10:
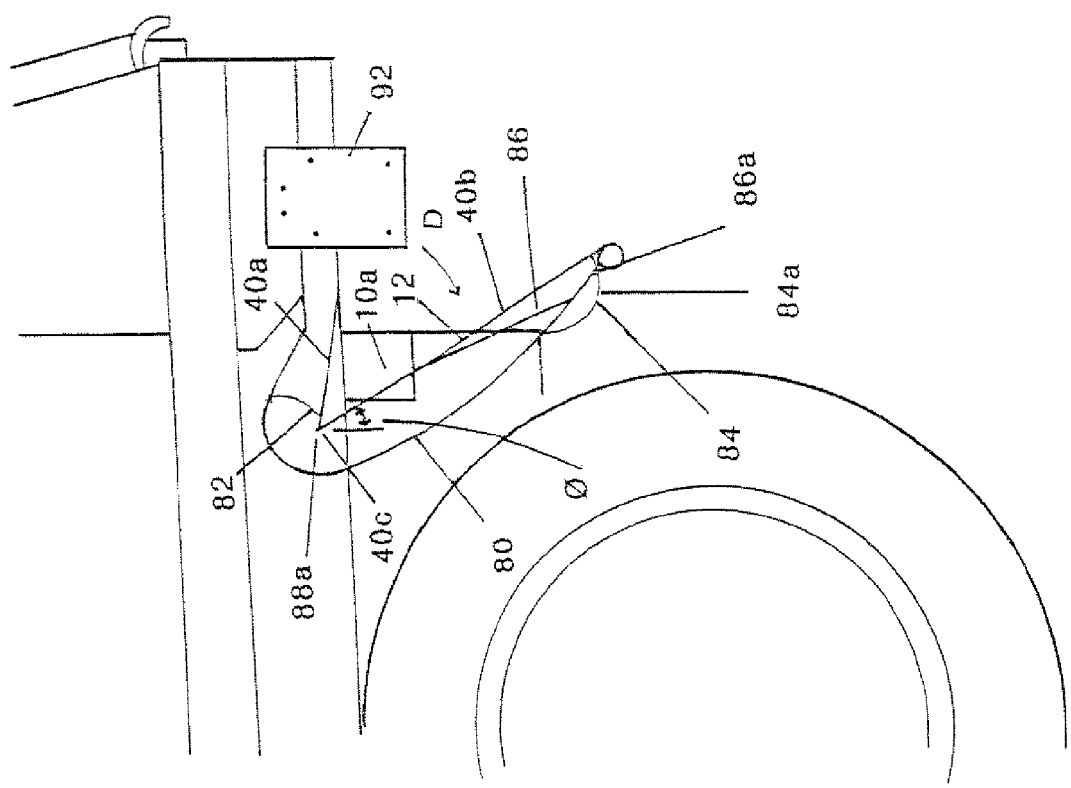
FIG. 10 is the view of FIG. 9 with the mud flaps lifted.
Figure 11:
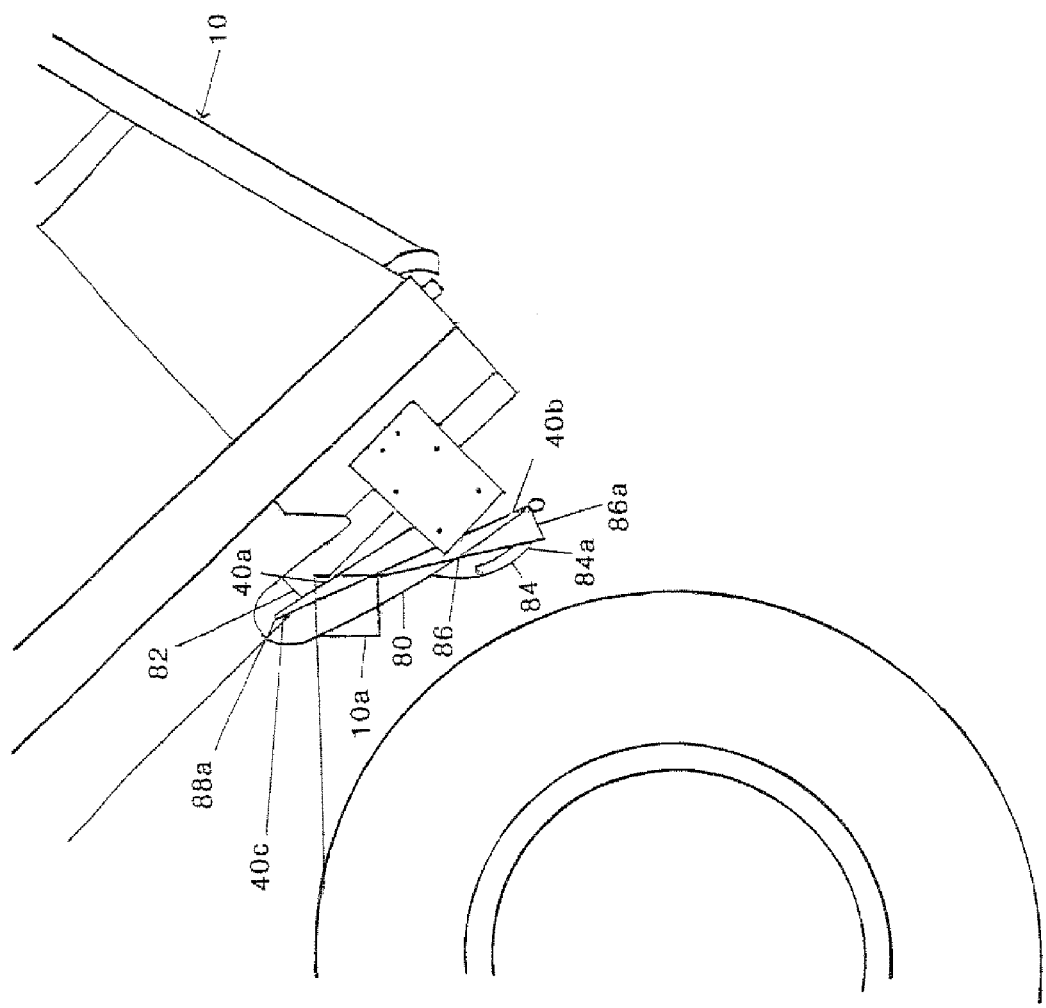
FIG. 11 is the view of FIG. 10 with the truck box lifted.
Figure 13:
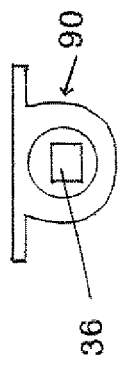
FIG. 13 is in end view a square bore bearing supporting the mud flap lifting shaft.
Figure 12:
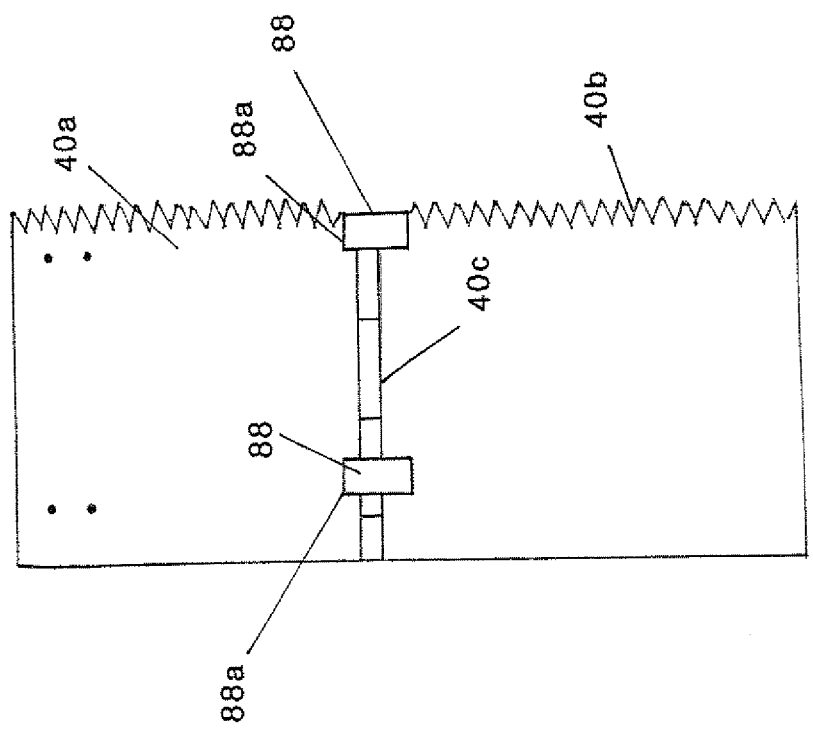
FIG. 12 is, in front elevation, one of the mud flaps of FIG. 9, with the anti-sail device and lifting guide step removed.

Depending on the truck configuration, in some instances when the mud flaps are raised the bottom portion of the flap cannot hang as seen in FIG. 5 as the mud flaps and the tires may get damaged. Consequently, for use in such instances a guide is installed on the truck frame and a step is installed on the bottom portion of the flap to fold and lift the flap up and away from the tire.

In one embodiment, not intended to be limiting, the mud flap lifting system is controlled by an electrical pneumatic system such as shown illustrated, wherein a back up switch 50 cooperates with electric-over-air valve 22 via electrical circuit 52. Back up switch 50 cooperates with truck transmission 54 such that when the transmission is put into reverse, the switch 50 trips the valve 22 so as to activate lifting the mud flaps 40 by actuation of cylinder 26. Simultaneously with actuation of mud flaps 40, in the event of switch 50 indicating the transmission 54 being put into reverse, back up light 56 is illuminated via an electrical circuit 58.

A further switch 60 is located between the truck frame and the box sill and is in electrical communication with valve 22 via circuit 62. Valve 22 is grounded to the truck frame via grounding wires 64.

Dashboard 66 located in the vehicle cab, may include a momentary-on switch 68 and a pilot light 70. Pilot light 70 indicates, via electrical circuit 72, the status of electric switch 74 mounted to air cylinder 26. Electric switch 74 indicates when mud flaps 40 are raised. Power is provided to the electric switches via wire 76 and fuse 78.

When mud flaps 40 are hanging generally vertically downwardly for example during their normal operation as mud flaps per se, in order to inhibit the rearward sailing of lower portions 40b of mud flaps 40 hinging rearwardly about hinges 40c, anti-sail cables 80 are mounted at their lower most ends to the corresponding lower most ends of lower portions 40b, and at their upper most ends anti-sail cables 80 are mounted to a fixed point on the truck frame. The lower end of anti-sail cables 80 forms an acute angle alpha with corresponding lower portions 40b so as to brace lower portions 40b from pivoting rearwardly, by the operation of stand off arms 82. Stand off arms 82 are mounted at their base end to upper portion 40a, for example, immediately adjacent hinges 40c so as to be cantilevered outwardly of upper portion 40a towards the rear tires 84 of the vehicle.

The distal ends 82a of stand off arms 82 may be formed as eyelets. Anti-sail cables 80 may be journalled through the corresponding eyelets 82a of the corresponding stand off arms 82. As mud flaps 40 are raised by the rotation of upper portions 40a in direction 13, stand off arms 82 also rotate in a circular arc parallel to that of arc C so that, with upper portions 40a in their fully raised positions such as seen in FIG. 5, the distal ends 82a are retracted in the sense that the acute angles alpha are collapsed and anti-sail cables 80 are thereby retracted flush along lower portions 40b. The anti-sail according to the present invention works very will with metal flaps, and with the cable passing through a stiffener and metal tabs on the inside of the flap to stop it from bending in.

Thus when the vehicle driver puts the transmission in reverse to dump the load, the mud flaps automatically lift up. A flashing light may preferably be activated on the dashboard. After dumping the load the driver presses the momentary switch down, which is for example located next to the flashing light on the dashboard. If the driver doesn't back up before dumping the load, a switch, located between the truck frame and box sill, activates the electric over-air valve and the mud flaps are lifted and the light on the dashboard comes on.

In the alternative preferred embodiment of FIG. 7-11 a pair of guide members 84 (shown in dotted outline in FIGS. 7 and 8), which may each be a length of round steel bar bent into a curve and welded so as to be vertical to the rear corners of the truck frame 12. Guide members 84 engage a corresponding pair of steps 86 mounted on the forward side of lower portions 40*b* of mud flaps 40. Each step 86 may be a piece of flat bar which extends vertically almost the full length of lower portion 40*b*. Each step 86 has a substantially right-angle bend at its lower-most end to foam a substantially horizontal notch in conjunction with the lower-most edge of lower portion 40*b* steps 86 may be welded into place, with the lower end near the bottom of lower portion 40*b*, and with the upper end welded near the hinge 40*c* at the top of the lower portion 40*b*, on the truck frame 12 side of each lower portion 40*b* so as to align each step 86 with its corresponding guide member 84. Each step is generally L-shaped in side-on-view, with the top and bottom of the "L" welded to lower portion 40*b*, and with the upper leg of the "L" forming an inclined slide, inclined from lower portion 40*b* at angle beta (B). As the mud flaps 40 are raised, the steps 86 touch the corresponding guide member 84. This urges the lower portion 40*b* of the mud flap to swing rearwardly to form an angle theta (T) between the lower portion 40*b* and the vertical. As each mud flap raises all the way up in direction B, the lower portion 40*b* and step 86 raise up and slide over guide member 84 until the foot 86*a* of step 86 is resting against the lower end of 84*a* of the guide member. This elevation of the mud flaps happens very quickly when the transmission of the truck is put into reverse. When the driver puts the box of the truck up to dump the load, the box 10 pivots about box hinge 10*a* so that rear part of the box starts to lower because it is behind box hinge 10*a*, upper and lower portions 40*a* and 40*b* of the mud flaps fold together in direction D, so as to end up in the almost fully folded-over position of FIG. 11. As before, the anti-sail cables and stand-off arms 82 provide a means to stop the mud flaps 40 from blowing out behind the truck, as caused by wind from forward travelling motion and the tires.

If the mud flaps are at a legal length hanging straight down, they would not be at a legal length measured straight down when sailing out the back of the truck. Cable 80 hangs from the underside of the truck box or framework. A short distance in front of the flaps a stiffener rod or stand-off arms 82 are provided having a hole, such as formed by using a chain link welded to one end, through which the cable passes. Arms 82 are welded to the upper portion 40*a* of the mud flap, just above the hinge 40*c*. Cable 80 passes down through the hole in distal-end of the stand-off arm, then at a n angle tightly to the bottom of the flap where it is fastened.

As seen in FIGS. 9-12, at the hinge line of hinge 30*c*, facing the tires are welded four pieces of flat bar (two per and flap) so as to form tabs 88. Tabs 88 are welded to the lower portion 40*b* of each mud flap so as to leave the tip ends 88*a* of the tabs sticking up form each lower portion 40*b*. Ends 88*a* of tabs 88 provide stops which stop the lower portions 40*b* from bending forward while allowing the lower portions 40*b* to swing back. When the flaps are raised the anti-sail cable becomes slack but stays in line because of the stiffener function of arms 82. When the flaps are lowered the arms 82 causes the cables to become tight again. Although the mud flaps are shown lifting towards the front of the trick, the mud flaps way in other embodiments lift toward the back of the truck. If they lift backwards, an anti-sail cable would not be needed. Instead four tabs may be welded to the back of the flaps which would stop the mud flaps sailing.

A second hinge may be used to accommodate special applications, wherein the mud flaps can lift to the back as well as the front.

Square bore bearings 90 may be mounted behind endplates 92 to support shaft 36.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A mud flap lifter system comprising:
   a mud flap having an upper portion and a lower portion, wherein said upper portion extends laterally across substantially an upper half of said mud flap, and wherein said lower portion extends laterally across substantially a lower half of said mud flap, and wherein an upper edge of said lower portion is pivotally mounted to a lower edge of said lower portion for rotation relative to said upper portion about a hinge line between said upper and lower edges of said lower and upper portion respectively, and wherein said upper portion is substantially planar and rigid, and wherein said lower portion is substantially planar and substantially inflexible,
   a shaft mountable transversely across a rear end of a vehicle, and adapted to be mounted horizontally across the vehicle behind the rearmost wheels of the vehicle,
   an actuator mountable to the vehicle so as to cooperate with said shaft for selective rotation of said shaft about a corresponding axis of rotation of said shaft,
   wherein an upper edge of said upper portion of said mud flap is mountable to said shaft, and when so mounted, rotation of said shaft by actuation of said actuator simultaneously rotates said upper portion of said mud flap, and wherein said rotation of said upper portion so as to raise said lower edge of said upper portion simultaneously and correspondingly raises said lower portion from a lowered position to a raised position, wherein said lower portion hangs freely about said hinge line so as to maintain a substantially vertically downwardly disposed orientation when said lower portion is in said lowered position,
   wherein during said rotation of said upper portion said lower edge of said upper portion is rotated along an upwardly curved trajectory, and wherein said upwardly curved trajectory does not intersect the rearmost wheels but, rather, remains clear of the rearmost wheels by at least a minimum set-back distance form the rearmost wheels,
   a substantially rigid guide member mountable to the rear end of vehicle at a level substantially corresponding to a upper end of the wheels, wherein said guide member has a base end mountable to the rear end of the vehicle and a rearwardly projecting distal end which is at said level substantially corresponding to the upper end of the wheels, wherein said guide member when so mounted to the rear end of the vehicle projects said distal end rearwardly of the rearmost wheels of the vehicle,
   wherein said lower portion of said mud flap includes a slide on a forward surface of said lower portion, and wherein during said raising of said mud flap said slide engages said distal end of said guide member when said guide member is mounted to the rear end of the vehicle so as to said rearwardly project said distal end from the level substantially corresponding to the upper end of the wheels, and wherein said guide member is sized so that when mounted to the rear end of the vehicle said lower portion of said mud flap is maintained at least at said minimum setback from the wheels as said lower portion folds about said hinge line relative to said upper portion, whereby said lower edge of said lower portion is elevated and maintained spaced apart rearwardly of the rearmost wheels of the vehicle and the ground clearance between said lower edge of said lower portion and a ground surface under the wheels is increased.

2. The system of claim 1 wherein said vehicle is a dump truck having a dump box pivotally mounted on a dump truck frame of said of said dump truck, and wherein, in said raised position, said upper and lower portions of said mud flap are folded about said hinge line so as to form a first acute angle between said upper and lower portions, and wherein said dump box said pivots on said frame about a box hinge, and wherein said shaft is mounted to said dump box to the rear of said box hinge so that, as said dump box is raised by pivoting a forward end of said dump box upwardly about said box hinge an opposite rear end of said dump box is lowered below said box hinge so as to also lower said shaft, wherein said lowering of said shaft lowers said upper edge of said upper portion and thereby reduces said first acute angle, and wherein when said rear end of said dump box is said lowered into a fully lowered position said first acute angle is greater than or equal to zero.

3. The system of claim 1 wherein said slide is a leg mounted to said front surface of said lower portion so as to form an inclined surface, inclined away from said front surface of said lower portion.

4. The system of claim 3 wherein said inclined surface fogies a wedge having a thin end of said wedge towards said upper edge of said lower portion and a thick end of said wedge towards said lower edge of said lower portion.

5. The system of claim 2 wherein said slide is a leg mounted to said front surface of said lower portion so as to form an inclined surface, inclined away from said front surface of said lower portion.

6. The system of claim 5 wherein said inclined surface forms a wedge having a thin end of said wedge towards said upper edge of said lower portion and a thick end of said wedge towards said lower edge of said lower portion.

7. The system of claim 1 further comprising an anti-sail cable having a lower end and an opposite upper end, said lower end of said cable attached below said hinge line to said lower portion, said upper end mountable to the vehicle, between the rear end of the vehicle and the rearmost wheels of the vehicle, so as to form a second acute angle between said cable and said lower portion when in said lowered position, whereby, when said system is mounted to the vehicle, rearward sailing of said lower portion of said mud flap is resisted by tension in said cable, wherein said second acute angle is reduced to substantially zero as said upper portion is rotated upwardly, and said lower portion raised, to a fully raised position.

8. The system of claim 7 further comprising an anti-sail cable stand-off bracket, wherein said stand-off bracket includes a rigid cantilevered member cantilevered from a forward face of said mud flap.

9. The system of claim 8 wherein said stand-off bracket is cantilevered substantially orthogonally from said forward face and mounted to said forward face on said upper portion of said mud flap.

10. The system of claim 9 wherein said stand-off bracket is adjacent said hinge line.

11. The system of claim 7 wherein said shaft is substantially square in cross section.

12. The system of claim 11 further comprising a bell crank mounted at one end thereof to one end of said actuator, and wherein said bell crank is mounted at an opposite end thereof onto said shaft.

13. The system of claim 12 wherein said bell crank is mounted onto said shaft by a clamp.

14. A method for lifting a mud flap using the mudflap lifter system of claim 7, the method comprising the steps of:
   a) providing the mudflap lifter system of claim 1,
      (i)
   b) rotating said shaft so as to rotate said upper portion and elevate said lower portion to increase the ground clearance between said lower edge of said lower portion and a ground surface under the wheels is increased, and to maintain said lower portion spaced apart rearwardly of the rearmost wheels of the vehicle.

15. The method of claim 14 wherein said vehicle is a dump truck having a dump box pivotally mounted on a dump truck frame of said of said dump truck, and wherein, in said raised position, said upper and lower portions of said mud flap are folded about said hinge line so as to form a first acute angle between said upper and lower portions,
   and wherein said dump box said pivots on said frame about a box hinge, and wherein said shaft is mounted to said dump box to the rear of said box hinge so that, as said dump box is raised by pivoting a forward end of said dump box upwardly about said box hinge an opposite rear end of said dump box is lowered below said box hinge so as to also lower said shaft, wherein said lowering of said shaft lowers said upper edge of said upper portion and thereby reduces said first acute angle, and wherein when said rear end of said dump box is said lowered into a fully lowered position said first acute angle is greater than or equal to zero.

16. The method of claim 14 wherein said slide is a step mounted to said front surface of said lower portion so as to form an inclined surface, inclined away from said front surface of said lower portion.

17. The method of claim 16 wherein said inclined surface forms a wedge having a thin end of said wedge towards said upper edge of said lower portion and a thick end of said wedge towards said lower edge of said lower portion.

18. The method of claim 14 further comprising providing an anti-sail cable having a lower end and an opposite end, wherein said lower end of said cable is attached below said hinge line to said lower portion, and wherein said upper end is mounted to the vehicle, between the rear end of the vehicle and the rearmost wheels of the vehicle, so as to form an acute angle between said cable and said lower portion of said mud flap when in said lowered position, and tensioning said cable so that rearward sailing of said lower portion of said mud flap during forward movement of said vehicle is resisted by said tension in said cable, and wherein said acute angle is reduced to substantially zero as said upper portion is rotated to a fully raised position.

19. The method of claim 18 further comprising providing an anti-sail cable stand-off bracket, wherein said stand-off bracket includes a rigid cantilevered member, said bracket mounted cantilevered from a forward face of said mud flap.

20. The method of claim 19 wherein said stand-off bracket is mounted so as to be cantilevered substantially orthogonally from said forward face and wherein said forward face is on said upper portion of said mud flap.

21. The method of claim 20 comprising mounting said stand-off bracket adjacent said hinge line.

* * * * *